United States Patent [19]

Gerk et al.

[11] Patent Number: 5,713,703
[45] Date of Patent: *Feb. 3, 1998

[54] PRESSURE CONTROLLED CUTTER BIT RETAINER WITH PRECISION ADJUSTABLE CUTTER BIT

[75] Inventors: Wilfried Gerk, Rödermark; Hartmut Hirt, Königstein; Gerhard Klee, Frankfurt, all of Germany

[73] Assignee: Samson AG, Frankfurt, Germany

[*] Notice: The terminal 36 months of this patent has been disclaimed.

[21] Appl. No.: 801,599

[22] Filed: Dec. 2, 1991

Related U.S. Application Data

[63] Continuation of Ser. No. 577,520, Sep. 5, 1990, Pat. No. 5,116,171.

[30] Foreign Application Priority Data

Sep. 5, 1989 [DE] Germany ............... 39 29 472.2

[51] Int. Cl.⁶ .................................................. B23B 29/18
[52] U.S. Cl. ................................................ 408/147; 408/714
[58] Field of Search .................................. 408/147, 154, 408/156, 714; 407/37, 45, 8–10; 82/1.2–1.5

[56] References Cited

U.S. PATENT DOCUMENTS

| | | | |
|---|---|---|---|
| 3,007,353 | 11/1961 | Garnett | 408/147 |
| 3,007,356 | 11/1961 | Jones | 408/147 |
| 3,864,054 | 2/1975 | Eysel | 408/147 |
| 3,977,194 | 8/1976 | Klee et al. | 60/547 |
| 4,443,140 | 4/1984 | Boetto | 408/147 |
| 5,116,171 | 5/1992 | Gerk et al. | 408/147 |

*Primary Examiner*—Steven C. Bishop
*Attorney, Agent, or Firm*—Anderson Kill Olick & Oshinsky, P.C.

[57] ABSTRACT

A pressure controlled cutter bit or drill bit retainer in the form of a revolving drill head with hydraulic precision adjustment of the drill bit arranged at a central extension, which is displaceable from its original position by small amounts around a pivot axis by a pressure motor, wherein this displacement occurs without any parts mechanically rubbing against each other and the dimensioning of the pressure motor and extension defining the transmission ratio conditions are selected in such a way that the travel of the drill bit guided along a curved path is greater than the travel of the pressure motor output produced by volume change, and wherein the overall volume of the pressure motor is selected to be slightly greater than the volume required for moving the pressure motor output.

4 Claims, 3 Drawing Sheets

PRESSURE CONTROLLED CUTTER BIT RETAINER WITH PRECISION ADJUSTABLE CUTTER BIT

This is a continuation of application Ser. No. 07/577,520, filed Sep. 5, 1990, now U.S. Pat. No. 5,116,171.

BACKGROUND OF THE INVENTION

The invention is directed to a pressure controlled cutter bit or drill bit retainer with a clampable cutter bit or drill bit, especially a hydraulically precision adjustable rotating drill head, with a pressure motor, comprising a base and an output sealed and resiliently mobile with respect to the base. Additionally, a mobile pressure seal, a pressure fluid chamber and a fluid supply are present, as well as an apparatus that converts motion of an output part into movement of the cutter bit on a curved path which extends approximately perpendicular to the axis of rotation.

The invention serves for solving the requirement occurring increasingly in modern manufacturing technology of fabricating internal cylinder barrel surfaces or areas as rapidly and accurately to size as possible, whose surface contour as a function of the travel of the drill bit parallel to the axis of rotation and as a function of the angle of rotation of the drill bit relative to the workpiece, deviates at most by 500 to 1,000µ from an exactly cylindrical barrel or jacket surface with a tolerance in the 1 µ-range ±50%. Such untrue or out-of-center holes whose surface thus deviates polarity-wise or axially from an axially parallel straight line or from an axially concentric circle can only be imperfectly produced or manufactured by the drill bit retainers of the type being discussed here and known hitherto, which are also designated as drill heads.

Assuming that the control pressure source provides the required control pressure at the right time and in the required magnitude, the mechanical actuation means of these drill heads must simultaneously have the following properties:

1. The drill or cutter bit must respond sufficiently accurately and without hysteresis effect to the control pressure; and
2. The natural frequency of the drill head must lie distinctly above the control pressure frequency. If these frequencies differ only by a small amount, then resonance effects occur which render the drill head unusable for utilization above this frequency range.

The drill heads in the state of the art fulfill either one or the other assumption. However, they do not fulfill both simultaneously.

Thus, in the drill head in U.S. Pat. No. 3,007,356, the driven end of the shaft transmits its excursion to the drill bit by means of parts rubbing against each other. Due to this friction, such a drill head cannot respond to small pressure changes whose effect does not exceed the frictional forces and also in case of larger forces, the drill bit position is not reproducibly linked with the control pressure, which has the effect that the same control pressure, depending on whether it is rising or falling, causes different drill bit positions or attitudes.

The drill heads in the teaching of DE 20 34 601-A2 and DE 22 58 553-A1 have indeed no friction and therefore produce workpieces true to dimensioning. However, their natural frequency is low because the reduced mass inertia moment referred to the drilling bit of all the parts moving relative to the base and, therefore, participating in an oscillation or vibration is large.

All drill heads in the state of the art have the additional disadvantage of comprising a large fluid chamber. With a large fluid chamber, because of the compressibility of the pressure fluid, a relatively large quantity of fluid must flow into or out of the fluid chamber through a fluid supply line offering a resistance for building up a specific pressure in the fluid chamber. Thus, a certain time is required until the pressure in the fluid chamber equals the control pressure. In the case of rapidly changing control pressure, the chamber pressure therefore deviates, as far as pressure amplitude and phase are concerned, from the control pressure upstream of the fluid supply and therefore positioning errors of the drill or boring bit occur.

SUMMARY OF THE INVENTION

Accordingly, it is an object of the present invention to improve the known pressure controlled drill bit retainers mentioned above and to refine them so that the changes of position of the drill bit can follow with the smallest delay possible a predetermined volume change in the assigned fluid chamber and with this force changes of the output can follow in a proportional manner and with the least delay possible, so that especially internal out-of-round cylinder barrel surfaces with deviations from the exact cylinder jacket shape of 500 to 1,000µ can be fabricated better and more accurately than hitherto with a tolerance in the 1µ range ±50%.

Pursuant to this object, and others which will become apparent hereafter, one aspect of the present invention resides in providing a rigid connection between the pressure motor output and the cutter bit, which rigid connection has no parts which mechanically rub against each other. Additionally, the output part has a travel which is smaller than the travel of the cutter bit.

Because of the design shape of the drill bit retainer in the invention, the reduced mass inertia moment of all parts moving with respect to the base and therefore participating in a vibration or oscillation referred to the drill bit becomes smaller than that of the known pressure controlled drill heads, where drill bit and pressure motor output cover the same travel in the course of their displacement. All this is referred to the same dimensions and masses of the drilling rod connecting the drill bit with the pressure motor output in the state of the art and in the invention. This entails that, thanks to the invention, the natural frequency of the drill head is higher than that of the known pressure controlled drill heads with otherwise equal spring stiffness or spring rate of the drill bit in the direction of its advancing travel. The drill bit of the drill head retainer in the invention thus responds considerably faster dimensionally accurately to the pressure changes of the fluid influencing it in its adjustment position.

A further advantage is that the spring stiffness or rate which can be measured at the drill bit and which is referred to its travel is determined essentially only by the inherent stiffness of the pressure motor. Finally, the measure of the design version of the drill bit retainer and of its drive means in the invention in a manner that the entire volume of the pressure means in the pressure motor is only slightly larger than the volume required for movement of the pressure motor output is especially advantageous and not only in drill bit retainers in the invention.

The novel features which are considered as characteristic for the invention are set forth in particular in the appended claims. The invention itself, however, both as to its construction and its method of operation, together with additional objects and advantages thereof, will be best understood from the following description of specific

DETAILED DESCRIPTION OF THE PREFERRED EMBODIMENTS

Figure 1:
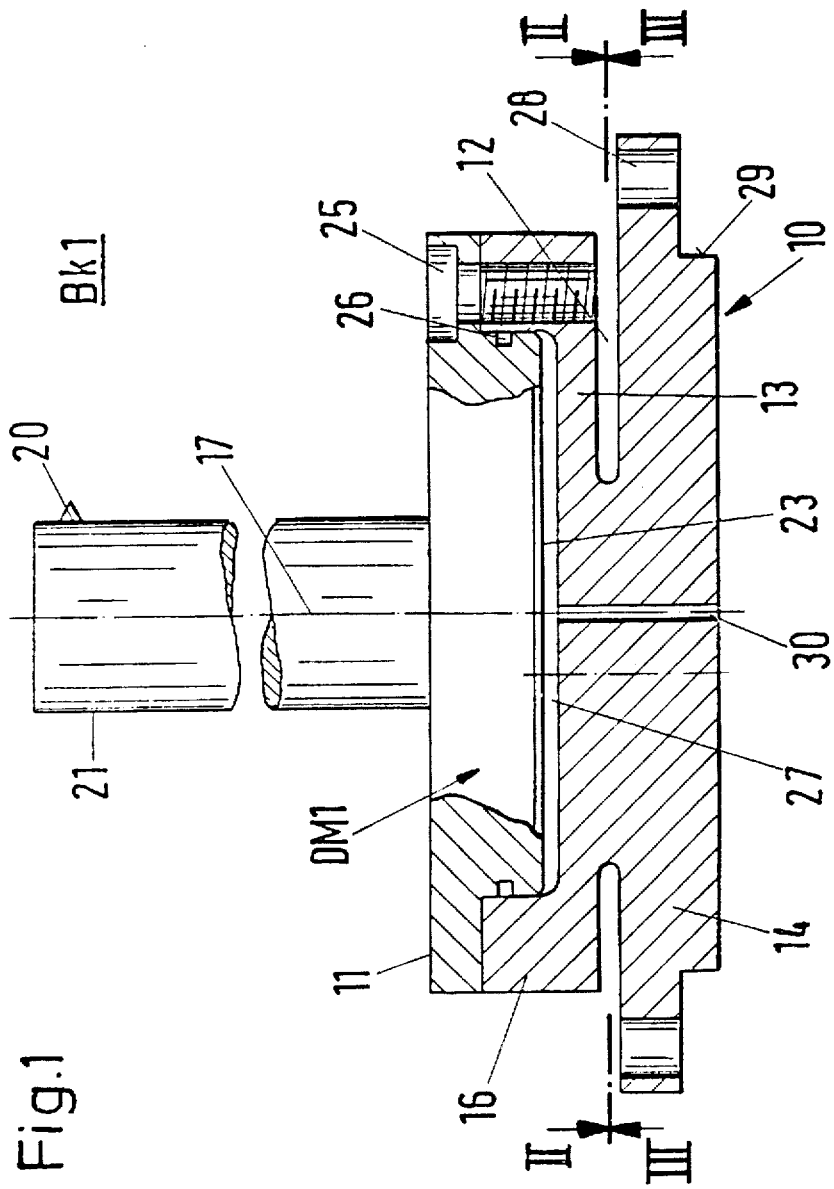
FIG. 1 is a side view partially in section showing a drill bit retainer pursuant to the invention depicted as a revolving drill head.
Figure 2:
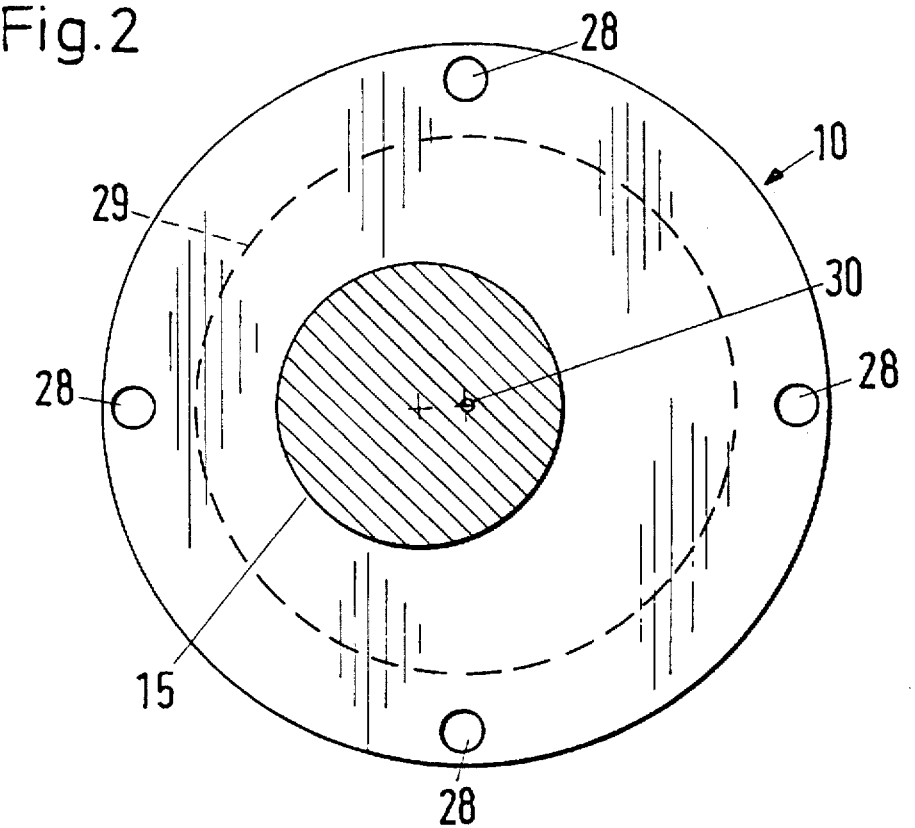
FIG. 2 is a section along the line II—II of FIG. 1, on a smaller scale.
Figure 3:
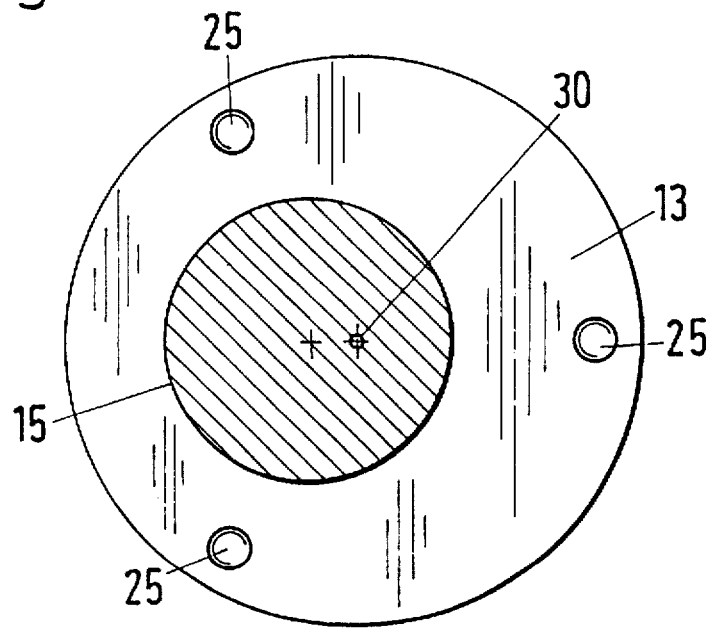
FIG. 3 is a section through line III—III of FIG. 1, on a smaller scale.

A first embodiment of the invention is shown in FIG. 1, where two parts 10 and 11 form a hydraulic drill head Bk1. The part 10 is a flat turned part with a circular cross-section which is subdivided into two segments by an eccentric recess 12 in the region of the sectional line II—II. One of the two segments is a thin plate 13 and the other segment forms a thick plate 14, which segments remain connected with each other by a round, eccentrically located segment 15. This relatively thin plate 13 formed by the recess or turned-down region in the upper portion of part 10 has approximately the shape of a closed "sickle" or "crescent"—see FIG. 3—and is resilient with respect to the segment forming the lower plate 14 and serves simultaneously as a mobile pressure seal for the pressure motor $DM_1$ which remains to be described. The wide part of the sickle lies on the right-hand side and the narrow part on the left-hand side, with reference to FIG. 2. On the narrow part, the plate 13 comprises, on a side facing away from the plate, an extension 16 shaped like a cylindrical jacket, which is arranged coaxially to the axis of symmetry 17 which is simultaneously the axis of rotation of the drill head and which extension 16 forms part of the pressure motor $DM_1$. The part 10 thus forms the rigid base of the pressure motor, which still remains to be explained.

The part 11 carries the drill rod 21 which includes the drill bit 20, and comprises an also centrally arranged piston shaped extension 23 at a side facing away from the drill rod 20, which extension 23 engages into the cylinder jacket shaped extension 16. The part 11 is fixedly connected in a leak proof manner with the part 10 by means of screws 25 and a seal in the form of a toroidal sealing ring 26 between facing cylinder jacket surfaces of the extensions 16 and 23. A fluid space or fluid chamber 27 is formed between the piston shaped extension 23 and the cylinder jacket shaped extension 16. The height of this chamber 27 as determined by the differing heights of extensions 16 and 23 is selected to be as small as possible due to the disadvantageous effect of compressibility of the fluid. The extensions 16 and 23 are part of the mentioned pressure motor $DM_1$, wherein the thin, elastic plate 13 of the part 10 is rigidly connected by screws 25 with the part 11 forming the output of the pressure motor.

Furthermore, the part 10 has holes 28 at the proximity of the outer edge and a centering flange 29 for attachment of the drill head at the drilling tool spindle (not shown here). The part 10 further comprises a central pressure means—or fluid supply line 30—which discharges into the flat disc-shaped fluid chamber 27.

Such a pressure motor thus comprises a base rigidly connected with the axis of rotation. The output portion moves with respect to the base when the pressure of the pressure fluid changes. Base and output parts embrace the fluid chamber, which has a fluid supply offering resistance to flow. So that the fluid chamber remains tightly sealed in spite of the motion of the output part, a mobile seal is provided. The output travel is the travel or path of the center of gravity of the output part with respect to the base caused by the change in pressure.

The control pressure source required for generation of the necessary control pressure is neither shown nor described since it is known as such and does not form part of the invention. The functional mode of the described arrangement is as follows:

If the pressure of the pressure means, in this case a fluid made available by the pressure source not shown here, is increased, then the fluid entering the space 27 will attempt to occupy a larger volume. Herein the right-hand part of the resilient plate 13, referring to FIG. 1, is more significantly deformed than the left-hand part because of the moment of resistance weakened by the recess 12. The part 11 thus pivots approximately counter-clockwise around a pivot axis near the plane of the pressure motor, forming itself eccentrically with reference to the axis of symmetry 17. If the pressure of the fluid reverts to the original pressure, then the plate 13 springs back to its original position and the drill rod also assumes its original position. The stiffness of this arrangement is defined by the dimensioning of its components, especially by the dimensioning of the resilient plate 13.

It is evident herein that the part 11 acting as the pressure motor output covers a smaller travel than the cutter bit or drill bit 21 moving along a curved path, and that the fluid volume of the entire arrangement is small and therefore the natural frequency of the drill head described is higher than in an arrangement with a drill rod, which moves parallel to the axis of symmetry 17 (DE 20 34 601 A2) because of a parallel spring joint during the drill bit advance.

Naturally, the drill rod can also be connected with the plate by means of a tool bit change system of known construction instead of the described rigid connection of the drill rod with the plate 11.

Figure 4:
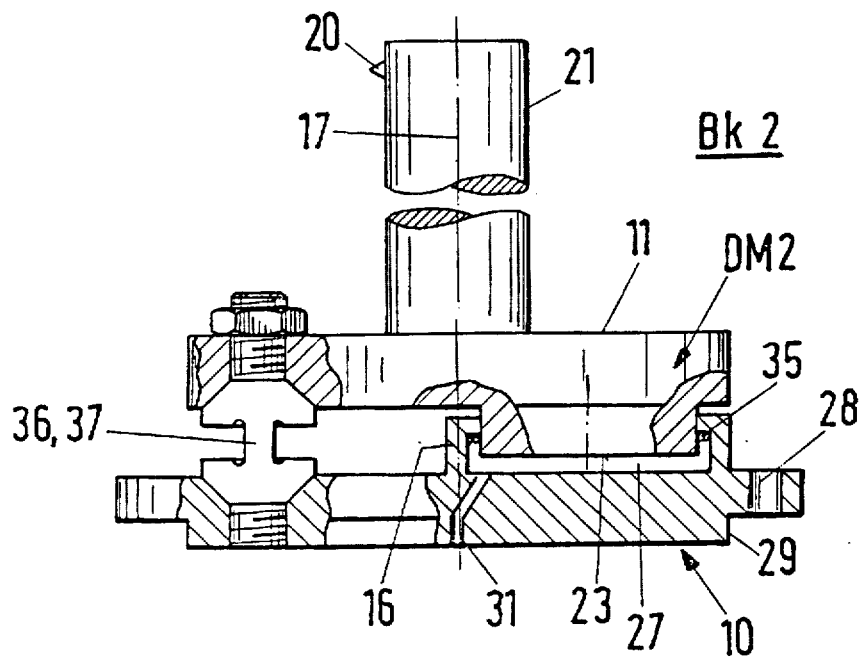
FIG. 4 is a side view shown partially in section of a second embodiment of a drill bit retainer of the invention, designed as a revolving drill head.
Figure 5:
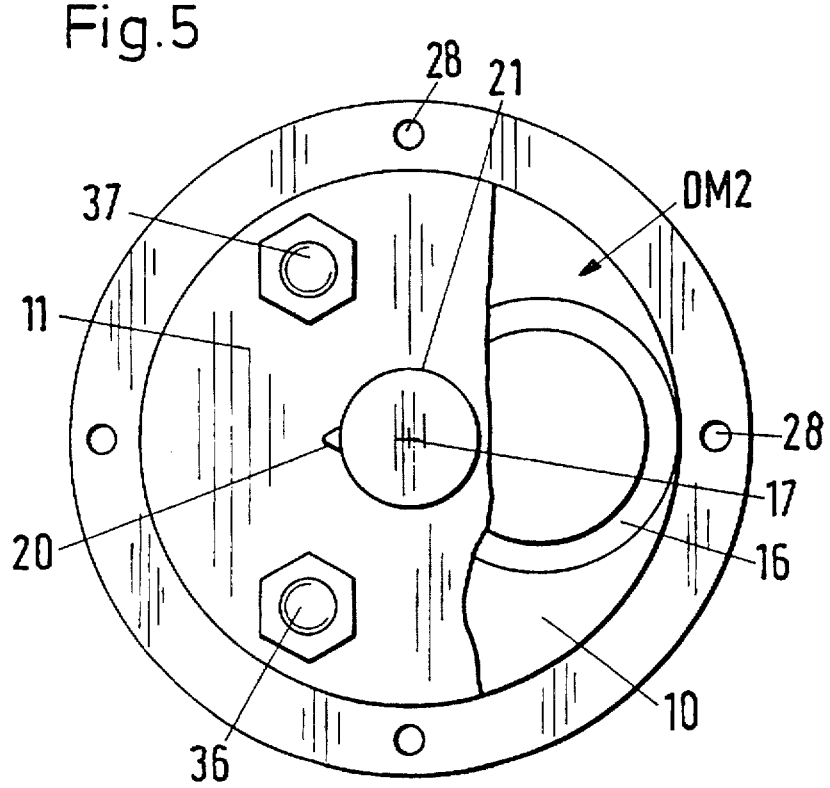
FIG. 5 is a plan view shown partially in section of the drill bit retainer of FIG. 4.

Another embodiment of the drill head of the invention designated Bk2 is shown in FIGS. 4 and 5. Here also the part forming the base plate is designated by 10 and the part carrying the drill rod 21 is designated by 11. Here also the drill head is fastened by means of the part 10 to the drilling spindle of a drilling machine tool, not shown here. Here also the pressure motor designated $DM_2$ comprises an extension 16 shaped as a cylinder jacket forming the base 10 and a piston shaped extension 23, wherein both extensions corresponding with each other are located on the parts 10 and 11 outside of the line of symmetry 17. The extensions 16 and 23 are fixed, connected detachably or non-detachably, with the associated plates sealed against each other by an elastomeric seal stressed by squeezing and they enclose the fluid space 27 between themselves.

The plate 10 forming the base is connected with the plate 11 forming the output of the pressure motor and carrying here the piston shaped extension 23 without play preferably by means of round spiral springs 36 and 37. The drilling rod 21 carrying the drill bit 20 is fixedly connected so as to be able to be replaced rigidly or by means of a tool bit replacement system. The pressure means or fluid is directed by an axial bore 31 extending in angled fashion to the fluid space 27 of the pressure motor.

If the pressure of the supplied pressure means rises, then the part 11 pivots counterclockwise around an axis extending approximately through the centers of the spiral springs 36 and 37 in the plane of the pressure motor.

The stiffness of the arrangement described in FIGS. 4 and 5 is essentially defined by the bending strength of the spiral springs 36 and 37 which are configured so as to be replaceable. This way the joint formed by the two spiral springs can be changed as far as its rigidity or stiffness is concerned. It can, for instance, be attained therein that with a predetermined maximum control pressure of 200 bar, the drill bit covers small travels if the drill head has a high stiffness and a high natural frequency and covers larger travels with a lower stiffness. This is important when adapting the drill head to the different materials which have to be machined by the cutter bit or serves for increasing the natural or inherent frequency if one can work with smaller maximum adjustment or actuation travels.

Naturally, a Bourdon tube or a metal capsule can be used as a pressure motor. Also, other known pressure motor designs, for instance in the form of a supported rubber diaphragm, are usable for this purpose.

While the invention has been illustrated and described as embodied in a pressure controlled cutter bit retainer with a precision adjustable cutter bit, 76 it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A boring apparatus, comprising:

a rotating hydraulic pressure controlled cutter bit retainer with a precision adjustable boring bar bearing a cutter bit;

a base shaped as a shallow rotational part with a circular cross-section and being formed of two segments of different thickness, an eccentric recess being provided between the two segments so as to form an eccentric plate, a thinner of the two segments having a cylinder jacket-shaped extension coaxial to the axis of symmetry of the boring bar; and an integrated pressure motor having a pressure fluid chamber and an output part sealed and resiliently mobile with respect to said base, the output part being connected in a rigid but flexural manner with the thinner segment of the base by way of the cylindrical extension which also forms part of the pressure motor, the pressure motor output part and the boring bar being a rigid unit without any parts which mechanically rub upon each other, so that displacement of the output part caused by a volume of pressure fluid is smaller than displacement of the cutter bit upon a curved path extending approximately perpendicularly to the axis of rotation of the cutter bit, the output part having a pivot axis tiltable with respect to said base and located externally of the axis of symmetry of the boring bar.

2. A boring apparatus according to claim 1, wherein the pressure fluid in the pressure motor ($DM_1$, $DM_2$) occupies a volume only slightly larger than the volume required for moving the pressure motor output part (11).

3. A boring apparatus according to claim 1, wherein the pressure motor output part is a stiff, round plate (11) tiltable with respect to said base (14) around the pivot axis located externally of the axis of symmetry (17) of the boring bar, said plate (11) being connected rigidly and in a tightly sealed manner with the bade by means of the thinner segment of the base which is provided as a thin, flexurally elastic and eccentrically stiffened round plate (13) which is arranged so as to serve as a mobile and resilient seal.

4. A boring apparatus according to claim 3, wherein an eccentric recess (12) is provided between the round plates (11, 13) so as to form a round plate (15) which also provides eccentric stiffening.

* * * * *